United States Patent
Eavenson, Sr. et al.

(10) Patent No.: US 10,427,735 B2
(45) Date of Patent: Oct. 1, 2019

(54) DRIVE SPROCKET FOR A TRACKED UTILITY VEHICLE

(71) Applicant: MTD PRODUCTS INC, Valley City, OH (US)

(72) Inventors: Jimmy N. Eavenson, Sr., Valley City, OH (US); Tim Dilgard, Valley City, OH (US); Ryan Cmich, Valley City, OH (US); Axel Schaedler, Valley City, OH (US)

(73) Assignee: MTD PRODUCTS INC, Valley City, OH (US)

( * ) Notice: Subject to any disclaimer, the term of this patent is extended or adjusted under 35 U.S.C. 154(b) by 0 days.

(21) Appl. No.: 14/412,133

(22) PCT Filed: Jul. 3, 2013

(86) PCT No.: PCT/US2013/049289
§ 371 (c)(1),
(2) Date: Dec. 30, 2014

(87) PCT Pub. No.: WO2014/008378
PCT Pub. Date: Jan. 9, 2014

(65) Prior Publication Data
US 2015/0191206 A1    Jul. 9, 2015

Related U.S. Application Data

(60) Provisional application No. 61/668,650, filed on Jul. 6, 2012, provisional application No. 61/668,671, filed on Jul. 6, 2012.

(51) Int. Cl.
*B62D 55/12* (2006.01)
*B62D 55/108* (2006.01)
(Continued)

(52) U.S. Cl.
CPC ............. *B62D 55/12* (2013.01); *B62D 55/10* (2013.01); *B62D 55/108* (2013.01);
(Continued)

(58) Field of Classification Search
CPC ...... B62D 55/12; B62D 55/125; B62D 55/13; B62D 55/135; B62D 55/10; B62D 55/108;
(Continued)

(56) References Cited

U.S. PATENT DOCUMENTS 1,836,446 A   12/1931  Walter
2,719,062 A    9/1955  Arps
(Continued)

FOREIGN PATENT DOCUMENTS

DE    1200144     9/1965
EP    0578504     1/1994
(Continued)

OTHER PUBLICATIONS

US 9,008,928 B2, 04/2015, Oishi et al. (withdrawn)
(Continued)

*Primary Examiner* — John Walters
(74) *Attorney, Agent, or Firm* — Wegman Hessler

(57) ABSTRACT

A drive sprocket for driving a track of a utility track vehicle is provided. The drive sprocket includes a pair of spaced-apart inner rings having a spacer fixedly attached between the inner rings. An adapter is attached to an outwardly-directed surface of one of the inner rings. A plurality of rods are attached in a spaced-apart manner about the outer peripheral edge of the inner rings. A guide ring is attached to each end of the rods in a perpendicular manner, wherein the guide rings are substantially parallel to the inner rings.

20 Claims, 6 Drawing Sheets

(51) Int. Cl.
 *B62D 55/112* (2006.01)
 *B62D 55/10* (2006.01)
 *B62D 55/14* (2006.01)

(52) U.S. Cl.
 CPC ........ *B62D 55/1083* (2013.01); *B62D 55/112* (2013.01); *B62D 55/1125* (2013.01); *B62D 55/14* (2013.01)

(58) Field of Classification Search
 CPC .............. B62D 55/1083; B62D 55/112; B62D 55/1125; B62D 55/14
 USPC ........................................ 305/195, 196, 199
 See application file for complete search history.

(56) References Cited

U.S. PATENT DOCUMENTS

| | | |
|---|---|---|
| 2,779,636 A | 1/1957 | Allen |
| 3,183,016 A | 5/1965 | Varne |
| 3,216,520 A | 11/1965 | Blonsky |
| 3,435,908 A | 4/1969 | Sunderlin et al. |
| 3,664,449 A | 5/1972 | Vardell |
| 3,666,034 A | 5/1972 | Baker |
| 3,744,583 A | 7/1973 | Bedard |
| 3,756,335 A | 9/1973 | Eisele |
| 3,789,942 A | 2/1974 | Kowalik |
| 3,826,388 A | 7/1974 | Oldenburg et al. |
| 3,860,079 A | 1/1975 | Hoffman |
| 3,888,132 A | 6/1975 | Russ, Sr. |
| 3,933,213 A | 1/1976 | Trowbridge |
| 3,938,605 A | 2/1976 | Koch |
| 3,938,606 A | 2/1976 | Yancey |
| 3,948,331 A | 4/1976 | Esch |
| 4,003,608 A | 1/1977 | Carter |
| 4,043,417 A | 8/1977 | Orpana |
| 4,166,511 A | 9/1979 | Stedman |
| 4,202,564 A | 5/1980 | Strader |
| 4,221,272 A | 9/1980 | Kell |
| 4,304,313 A | 12/1981 | Van Der Lely |
| 4,325,443 A | 4/1982 | Fischer |
| 4,378,133 A | 3/1983 | Trautwein |
| 4,458,955 A | 7/1984 | Webb |
| 4,462,480 A | 7/1984 | Yasui et al. |
| 4,501,452 A | 2/1985 | Huang |
| 4,513,833 A | 4/1985 | Sheldon |
| 4,566,553 A | 1/1986 | McCutcheon |
| 4,618,015 A | 10/1986 | Yochum |
| 4,683,970 A | 8/1987 | Smith |
| 4,706,769 A | 11/1987 | Latourelle et al. |
| 4,953,919 A | 9/1990 | Langford |
| 4,987,965 A | 1/1991 | Bourret |
| 5,258,912 A | 11/1993 | Ghoneim |
| 5,273,126 A | 12/1993 | Reed et al. |
| 5,316,381 A | 5/1994 | Isaacson et al. |
| 5,318,141 A | 6/1994 | Hansen |
| 5,323,866 A | 6/1994 | Simard |
| 5,372,212 A | 12/1994 | Davis |
| 5,393,134 A | 2/1995 | Oertley |
| 5,409,075 A | 4/1995 | Nieman |
| 5,409,305 A | 4/1995 | Nagorcka |
| 5,575,347 A | 11/1996 | Uchibaba |
| 5,607,210 A | 3/1997 | Brazier |
| 5,622,234 A | 4/1997 | Nagorcka et al. |
| 5,727,643 A | 3/1998 | Kawano |
| 5,791,429 A | 8/1998 | Bergman |
| 5,860,486 A | 1/1999 | Boivin |
| 5,899,541 A * | 5/1999 | Ying ................... B62D 55/125 305/115 |
| 5,899,543 A | 5/1999 | Lykken et al. |
| RE36,284 E | 8/1999 | Kelderman |
| 5,938,301 A * | 8/1999 | Hostetler ............... B62D 55/12 305/110 |
| 5,975,226 A | 11/1999 | Matsumoto et al. |
| 5,988,775 A | 11/1999 | Nordberg |
| 6,000,766 A | 12/1999 | Takeuchi et al. |
| 6,006,847 A | 12/1999 | Knight |
| 6,074,025 A * | 6/2000 | Juncker .............. B62D 49/0635 305/125 |
| 6,123,399 A | 9/2000 | Snyder |
| 6,135,220 A | 10/2000 | Gleasman et al. |
| 6,164,399 A | 12/2000 | Bays |
| 6,199,646 B1 | 3/2001 | Tani et al. |
| 6,241,327 B1 | 6/2001 | Gleasman et al. |
| 6,253,867 B1 | 7/2001 | Lilbacka |
| 6,260,465 B1 | 7/2001 | Zonak et al. |
| 6,289,995 B1 | 9/2001 | Fuller |
| 6,450,280 B1 | 9/2002 | Pepka et al. |
| 6,485,115 B1 * | 11/2002 | Egle ..................... B62D 55/092 305/117 |
| 6,543,862 B1 | 4/2003 | Kahle |
| 6,547,345 B2 | 4/2003 | Phely |
| 6,595,603 B2 | 7/2003 | Rutz et al. |
| 6,615,939 B1 | 9/2003 | Karales et al. |
| 6,655,482 B2 | 12/2003 | Simmons |
| 6,733,093 B2 | 5/2004 | Deland et al. |
| 6,807,466 B2 | 10/2004 | Strothmann |
| 6,810,975 B2 | 11/2004 | Nagorcka et al. |
| 6,840,338 B2 | 1/2005 | Bowers et al. |
| 6,860,571 B2 | 3/2005 | Scheetz |
| 6,892,838 B2 | 5/2005 | Bowers |
| 6,904,986 B2 | 6/2005 | Brazier |
| 6,904,993 B1 | 6/2005 | Rinck |
| 6,926,108 B1 | 8/2005 | Polakowski et al. |
| 6,962,219 B2 | 11/2005 | Hauser |
| 7,017,688 B2 | 3/2006 | Bowers et al. |
| 7,131,508 B2 | 11/2006 | Brazier |
| 7,267,414 B2 | 9/2007 | Scheetz |
| 7,308,958 B2 | 12/2007 | Tamor |
| 7,328,760 B2 | 2/2008 | Inaoka et al. |
| 7,367,637 B2 | 5/2008 | Gleasman |
| 7,416,266 B2 | 8/2008 | Soucy et al. |
| 7,464,785 B2 | 12/2008 | Spark |
| 7,478,688 B2 | 1/2009 | Ki |
| 7,520,348 B2 | 4/2009 | Bergsten et al. |
| 7,552,785 B2 | 6/2009 | Tuhy |
| 7,562,727 B1 | 7/2009 | Hoffart |
| 7,575,289 B2 * | 8/2009 | Sugihara ................ B62D 55/08 305/107 |
| 7,597,161 B2 | 10/2009 | Brazier |
| 7,641,006 B2 | 1/2010 | Scheetz |
| 7,644,788 B2 | 1/2010 | Scheetz |
| 7,673,711 B1 | 3/2010 | Berg |
| 7,677,344 B2 | 3/2010 | Medina et al. |
| 7,708,092 B2 | 5/2010 | Després |
| 7,784,884 B2 | 8/2010 | Soucy |
| 7,914,022 B2 | 3/2011 | Ruebusch |
| 7,992,659 B2 | 8/2011 | Schaedler |
| 8,002,365 B2 | 8/2011 | Jacobsen et al. |
| 8,011,458 B2 | 9/2011 | Hauser |
| 8,083,242 B2 | 12/2011 | Brazier |
| 8,104,846 B2 | 1/2012 | Porubcansky et al. |
| 8,152,248 B2 | 4/2012 | Brazier |
| 8,430,188 B2 | 4/2013 | Hansen |
| 8,474,841 B2 | 7/2013 | Ruebusch |
| 8,573,348 B2 | 11/2013 | Cantemir |
| 8,579,065 B2 | 11/2013 | Bergsten |
| 8,630,770 B2 | 1/2014 | Matsumoto |
| 8,701,801 B2 | 4/2014 | Itou |
| 8,746,815 B2 * | 6/2014 | Reshad .................. B62D 55/12 305/135 |
| 8,783,390 B2 | 7/2014 | Maeda |
| 8,855,861 B2 | 10/2014 | Goebel |
| 9,008,915 B2 | 4/2015 | Kang et al. |
| 9,566,858 B2 | 2/2017 | Hicke |
| 9,586,634 B2 | 3/2017 | Buchanan |
| 9,688,324 B2 | 6/2017 | Eavenson, Sr. |
| 9,884,662 B2 | 2/2018 | Eavenson, Sr. |
| 2002/0153188 A1 | 10/2002 | Brandt |
| 2003/0180370 A1 | 9/2003 | Lesniak |
| 2004/0099451 A1 | 5/2004 | Nagorcka |
| 2004/0244349 A1 | 12/2004 | Meier |
| 2005/0035655 A1 | 2/2005 | Beckstrom |
| 2005/0077984 A1 | 4/2005 | Lee |
| 2005/0248214 A1 | 11/2005 | Sugihara et al. |

(56) References Cited

U.S. PATENT DOCUMENTS

| | | |
|---|---|---|
| 2006/0180370 A1 | 8/2006 | Polakowski |
| 2009/0278403 A1 | 11/2009 | Canossa |
| 2009/0308669 A1 | 12/2009 | Vos et al. |
| 2010/0012399 A1 | 1/2010 | Hansen |
| 2010/0060075 A1 | 3/2010 | Hansen |
| 2010/0139994 A1 | 6/2010 | Hansen |
| 2010/0307843 A1 | 12/2010 | Lawson |
| 2012/0161511 A1 | 6/2012 | Brazier |
| 2012/0242142 A1 | 9/2012 | Kautsch |
| 2013/0026819 A1 | 1/2013 | Reshad |
| 2013/0126196 A1 | 5/2013 | Rosenboom |
| 2013/0192905 A1 | 8/2013 | Janzen et al. |
| 2014/0175865 A1 | 6/2014 | Korus |
| 2014/0288763 A1 | 9/2014 | Bennett |
| 2014/0305715 A1 | 10/2014 | Makino |
| 2015/0129329 A1 | 5/2015 | Cox |
| 2015/0134202 A1 | 5/2015 | Dawson |

FOREIGN PATENT DOCUMENTS

| | | |
|---|---|---|
| JP | 07-205852 | 8/1995 |
| JP | 07205852 | 8/1995 |
| JP | 10-129544 | 5/1998 |
| JP | 3937643 | 6/2007 |
| KR | 1020010078749 | 8/2001 |
| WO | 9311022 | 6/1993 |
| WO | 2003059720 | 7/2003 |
| WO | 2005101945 | 11/2005 |
| WO | 2010046905 | 4/2010 |
| WO | 2014008378 | 1/2014 |

OTHER PUBLICATIONS

International Search Report and Written Opinion dated Oct. 7, 2013 for corresponding patent application No. PCT/US2013/049289.
International Search Report and Written Opinion dated Oct. 11, 2013 for corresponding patent application No. PCT/US2013/049278.
International Search Report and Written Opinion mailed Nov. 5, 2015 for PCT/US2015/046266 filed Aug. 21, 2015.
International Search Report and Written Opinion for corresponding International Application No. PCT/US2014/055424 dated Dec. 5, 2014.
Corrected Notice of Allowability dated May 31, 2017 for U.S. Appl. No. 14/484,993.
Corrected Notice of Allowability dated Nov. 8, 2017 for related U.S. Appl. No. 14/484,899; (pp. 1-2).
Notice of Allowance dated Apr. 11, 2018 for related U.S. Appl. No. 15/168,945 (pp. 1-7).
Notice of Allowance dated Jun. 6, 2017 for U.S. Appl. No. 14/412,285; (pp. 1-8).
Notice of Allowance dated Nov. 20, 2017 for related U.S. Appl. No. 15/450,896; (pp. 1-6).
Notice of Allowance dated Sep. 21, 2017 for related U.S. Appl. No. 14/484,899; (pp. 1-7).
Office Action dated Feb. 5, 2018 for related CN App. No. 201480050347.5.
Office Action dated Mar. 10, 2017 for related U.S. Appl. No. 15/381,003.
Office Action dated Apr. 1, 2017 for related CN App. No. 201480050347.5.
Office Action dated Jan. 24, 2018 for related U.S. Appl. No. 15/381,003; (pp. 1-13).
Office Action dated Sep. 27, 2017 for related U.S. Appl. No. 15/168,945; (pp. 1-9).
First Action Interview Pilot Program Pre-Interview Communication dated Jul. 12, 2018 for U.S. Appl. No. 15/890,322; (pp. 1-4).
First Action Interview Pilot Program Pre-Interview Communication dated Jul. 12, 2018 for U.S. Appl. No. 15/890,335; (pp. 1-4).
Office Action dated May 27, 2016 for related U.S. Appl. No. 14/484,993.
International Search Report and Written Opinion dated Dec. 7, 2016 for related PCT/US2016/035025.
Office Action dated Apr. 14, 2016 for related U.S. Appl. No. 14/724,172.
Office Action dated Nov. 29, 2016 for related U.S. Appl. No. 14/484,899.
Final Office Action dated Jul. 12, 2016 for related U.S. Appl. No. 14/412,285.
Office Action dated Feb. 8, 2016 for related U.S. Appl. No. 14/412,285.
Notice of Allowance dated Jan. 4, 2017 for related U.S. Appl. No. 14/484,993.
Notice of Allowanace dated Sep. 26, 2018 for U.S. Appl. No. 15/890,322 (pp. 1-8).
Notice of Allowance dated Sep. 25, 2018 for U.S. Appl. No. 15/890,335 (pp. 1-8).
Office Action of Related Canadian Patent Application No. 2,878,283 dated May 30, 2019, pp. 1-3.
Office Action of Related Canadian Patent Application No. 2,878,285 dated Apr. 30, 2019, pp. 1-3.
Communication under Rule 71(3) EPC for corresponding European Patent Application No. 15763446.0 dated Jun. 21, 2019 (pp. 1-7).
EPC Communication pursuant to Article 94(3) EPC for corresponding European Patent Application No. 1477226.3 dated Nov. 8, 2018 (pp. 1-3).
EPC Communication pursuant to Article 94(3) EPC for corresponding European Patent Application No. 16729432.1 dated Mar. 19, 2019 (pp. 1-6).
International Search Report and Written Opinion dated Jan. 11, 2019, for related PCT/US2018/049559 (pp. 1-17).

\* cited by examiner

DRIVE SPROCKET FOR A TRACKED UTILITY VEHICLE

CROSS-REFERENCE TO RELATED APPLICATIONS

This application claims the priority under 35 U.S.C. 119 to U.S. Provisional Patent Application Ser. No. 61/668,650 filed Jul. 6, 2012, and entitled "DRIVE SPROCKET FOR A TRACKED UTILITY VEHICLE", and to U.S. Provisional Patent Application Ser. No. 61/668,671 filed Jul. 6, 2012, and entitled "SUSPENSION AND LOCK-OUT SYSTEMS FOR A TRACKED VEHICLE", both of which are herein incorporated by reference in their entireties.

FIELD OF THE INVENTION

The present invention is directed to a drive sprocket, and more particularly, a drive sprocket for a tracked utility vehicle having a suspension.

BACKGROUND OF THE INVENTION

Track drive machines typically include those with metal or composite cleats that are connected together to form continuous loops and those constructed of reinforced polymer/rubber materials that are manufactured in endless loops.

Tracked vehicles are typically designed so as to produce ground pressures lower than that of wheeled vehicles. Heavy machines are typically below 15 lb/in$^2$, but lightweight machines are ranging as low as 1 to 3 lb/in$^2$. The stiffness of the track is selected to minimize flexing between the bogie wheels. The track is therefore kept substantially straight between the bogie wheels, idlers, and the drive sprocket to increase the efficiency associated with transference of power to the tracks and losses due to misalignment. Track tension, especially for non-metallic endless-loop configurations, must be maintained within prescribed parameters in order to prevent buckling in slack sections.

Drive sprockets are sometimes positioned above the ground to reduce contamination, reduce complexity in the design while effectively transmitting power to the tracks. Positioning the drive sprockets above ground also helps to prevent derailing of the track. Tracks are generally held in a constant state of tension on the drive sprocket and the roller, and this also helps to prevent derailment.

These offerings have limitations in performance in regard to lateral derailment of tracks, drive lug skipping (ratcheting), and backlash impacts from sprocket engagement to drive lug during traction direction load reversals.

A need therefore exists for a drive sprocket for a tracked utility vehicle in which the drive sprocket maintains closer engagement with guide lugs on track. A need also exists for a drive sprocket for a tracked utility vehicle that reduces the wear and increases the longevity of the guide lugs and adjacent lugs on the track.

BRIEF SUMMARY OF THE INVENTION

In one aspect of the invention, a drive sprocket for driving a track of a tracked utility vehicle comprises: a pair of spaced-apart inner rings, wherein the inner rings are oriented in a substantially spaced-apart manner, each of the inner rings having an outer peripheral edge; a plurality of rods attached to the inner rings adjacent to the outer peripheral edge thereof; and a pair of guide rings fixedly attached to the rods, wherein each of the guide rings is attached adjacent to an opposing end of the rods, the guide rings being oriented substantially parallel to each other and the inner rings.

In another aspect of the drive sprocket, a spacer is positioned between the inner rings, the spacer being fixedly attached to the inner rings.

In another aspect of the drive sprocket, an adapter is attached to an outwardly-directed surface of one of the pair of inner rings.

In another aspect of the drive sprocket, a slide ring is attached to an outwardly-directed surface of each of the guide rings.

In another aspect of the drive sprocket, an outwardly-directed surface of each of the guide rings is coated with a friction-reducing material.

In another aspect of the drive sprocket, each of the plurality of rods is spaced-apart from adjacent rods.

In another aspect of the drive sprocket, the plurality of rods form a plurality of clusters, wherein each of the clusters is formed of a pair of the rods and each of the cluster is spaced-apart from adjacent clusters about the peripheral edge of the inner rings.

In another aspect of the drive sprocket, the rods are cylindrically shaped having a circumferential surface.

In another aspect of the drive sprocket, a portion of the circumferential surface of the rods extend radially outward away from the outer peripheral surface of the inner rings relative to a rotational axis of the drive sprocket.

In another aspect of the drive sprocket, a portion of the circumferential surface of the rods extend radially outward away from the outer peripheral surface of the guide rings relative to a rotational axis of the drive sprocket.

In another aspect of the drive sprocket, a portion of the circumferential surface of the rods extend radially outward away from the outer peripheral surface of the inner rings relative to a rotational axis of the drive sprocket, and a portion of the circumferential surface of the rods extend radially outward away from the outer peripheral surface of the guide rings relative to a rotational axis of the drive sprocket.

Advantages of the present invention will become more apparent to those skilled in the art from the following description of the embodiments of the invention which have been shown and described by way of illustration. As will be realized, the invention is capable of other and different embodiments, and its details are capable of modification in various respects.

BRIEF DESCRIPTION OF SEVERAL VIEWS OF THE DRAWINGS

These and other features of the present invention, and their advantages, are illustrated specifically in embodiments of the invention now to be described, by way of example, with reference to the accompanying diagrammatic drawings, in which.

Figure 1A:
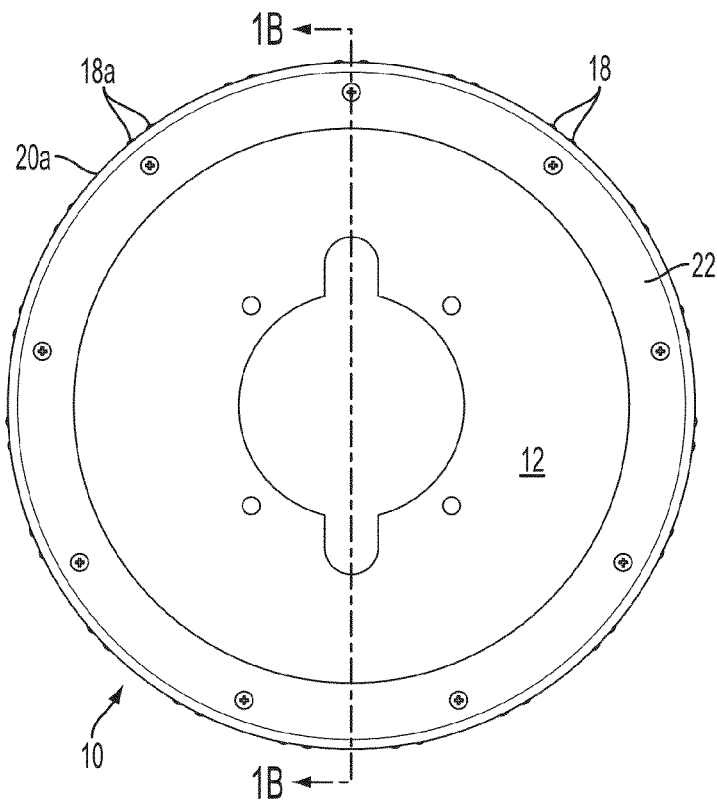
FIG. 1A is an end view of a first exemplary embodiment of a drive sprocket.

It should be noted that all the drawings are diagrammatic and not drawn to scale. Relative dimensions and proportions of parts of these figures have been shown exaggerated or reduced in size for the sake of clarity and convenience in the drawings. The same reference numbers are generally used to refer to corresponding or similar features in the different embodiments. Accordingly, the drawing(s) and description are to be regarded as illustrative in nature and not as restrictive.

DETAILED DESCRIPTION OF THE PREFERRED EMBODIMENT

Approximating language, as used herein throughout the specification and claims, may be applied to modify any quantitative representation that could permissibly vary without resulting in a change in the basic function to which it is related. Accordingly, a value modified by a term or terms, such as "about", is not limited to the precise value specified. In at least some instances, the approximating language may correspond to the precision of an instrument for measuring the value. Range limitations may be combined and/or interchanged, and such ranges are identified and include all the sub-ranges stated herein unless context or language indicates otherwise. Other than in the operating examples or where otherwise indicated, all numbers or expressions referring to quantities of ingredients, reaction conditions and the like, used in the specification and the claims, are to be understood as modified in all instances by the term "about".

"Optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present.

As used herein, the terms "comprises", "comprising", "includes", "including", "has", "having", or any other variation thereof, are intended to cover a non-exclusive inclusion. For example, a process, method, article or apparatus that comprises a list of elements is not necessarily limited to only those elements, but may include other elements not expressly listed or inherent to such process, method, article, or apparatus.

The singular forms "a", "an", and "the" include plural referents unless the context clearly dictates otherwise.

The proposal provides for metallic or composite material sprocket with a central hub with radial extensions (such as discs or spokes) to connect with teeth equally spaced in an annual arrangement. The teeth are spaced to engage the track drive lugs near their tooth roots and to match the track pitch length in a neutral or a slightly under-pitch condition.

The drive sprocket is provided with rod-shaped teeth that engage the traction drive lugs of the tracks close to the traction drive lug pitch line so as to reduce bending moments and stress on the drive lugs. The sprocket teeth do not appreciably "scrub" the areas between the drive lugs during traction drive load force reversals such as during machine acceleration and deceleration and turning maneuvers. One embodiment shown includes two (or more) rods to further minimize the backlash. This reduction in backlash also reduces the propensity for track drive lug skipping. In other embodiments, only one rod is present at each drive rod-tooth location.

The drive sprocket includes a pair of guide rings that attach to the drive rod-teeth, and they laterally engage guide lugs during turning maneuvers to prevent track derailment. These rings greatly strengthen the drive rod-teeth and help to increase the contact areas of the teeth while also reducing track deformation (flexing of the rods without the ring supports allow a crowning effect of the tracks at the sprockets). In one embodiment, these rings are equipped with low friction materials to reduce scrub friction with the guide lugs. In other embodiments, a low friction material is not present on the guide rings.

Figure 1B:
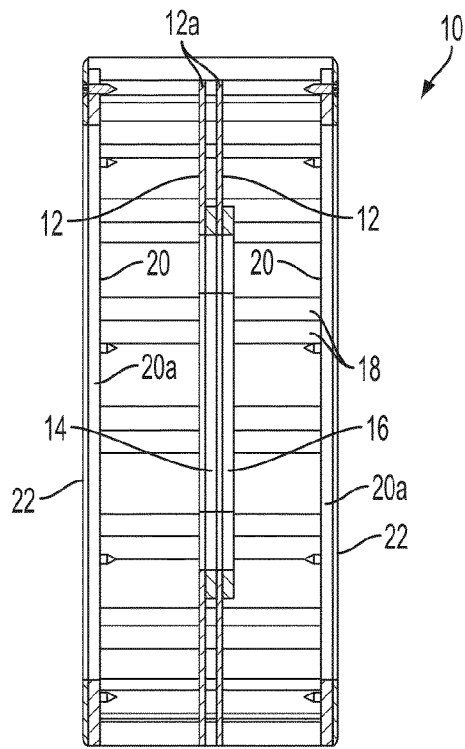
FIG. 1B is a view of a first exemplary embodiment of a drive sprocket taken along line 1B of FIG. 1A.
Figure 1C:
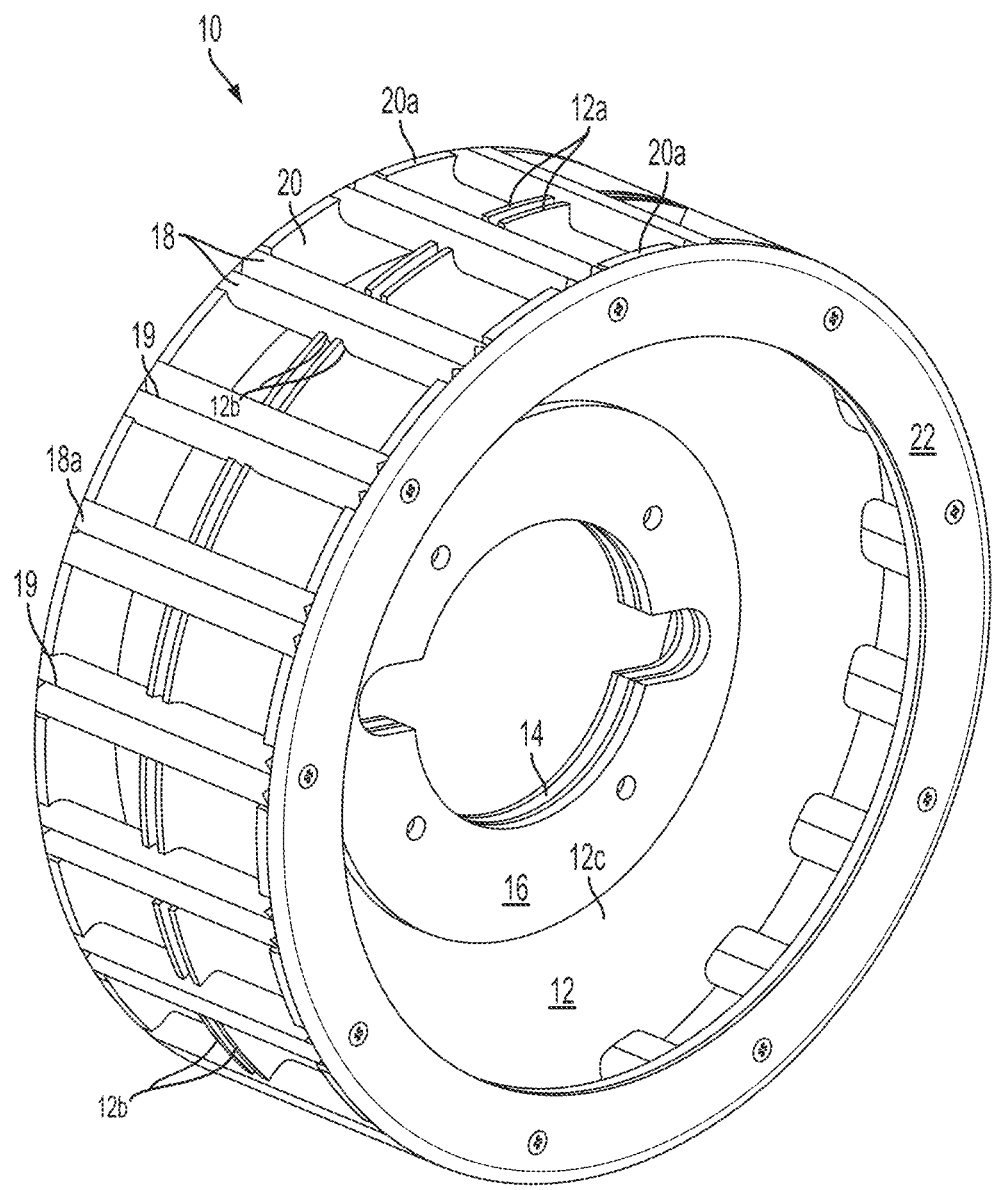
FIG. 1C is a perspective view of a first exemplary embodiment of a drive sprocket.

The following features are incorporated:

A sprocket incorporating a central drive hub, radial extensions to connect with teeth, single rod-shaped teeth annularly spaced at the pitch-length of the track, and rings attached to the teeth Same as above but with multiple rods at each tooth location Same as above, but with low-friction materials coated onto or attached to the rings Same as above but with the teeth annularly spaced at less than the pitch-length of the track, up to 1% under-pitch In the embodiment illustrated in FIGS. 1A-C, the drive sprocket 10 includes a pair of substantially circular inner rings 12. A spacer 14 is positioned between the pair of inner rings 12 to allow the inner rings 12 to be spaced apart and have a peripheral edge 12b. The thickness of the spacer 14 is between about 0.10 inches and about 3.0 inches. The spaced-apart inner rings 12 provide lateral stiffness to the drive sprocket 10, particularly with respect to the lateral forces experienced during a turn of the utility vehicle. The spacer 14 is sandwiched between the inner rings 12. An adapter 16 is positioned adjacent to the outwardmost inner ring 12 relative to the utility vehicle when the drive sprocket 10 is operatively connected to the utility vehicle. Accordingly, the adapter 16 attached to an outwardly-directed surface 12c of one of the pair of inner rings 12. The adapter 16 is configured to engage a drive shaft or other rotatable shaft that operatively transfers rotation from the engine to the drive sprocket 10. When the drive sprocket 10 is installed onto the drive shaft, the adapter 16 is directed away from the utility vehicle.

In an embodiment, the inner rings 12 and the spacer 14 can be formed as a single member having an equivalent thickness. The spacer 14 allows the inner rings 12 to provide the structural integrity to the rods 18 while reducing the weight of the drive sprocket 10. In a similar manner, the adapter 16 can also be formed as having a diameter that is substantially the same as the inner rings 12. The spacer 14 and adapter 16 are attached to the inner rings 12 to allow the drive sprocket 10 to be attached to the drive shaft from an engine while transferring the rotational force to the inner rings 12. In another embodiment, the inner rings 12, spacer 14, and adapter 16 all include a common aperture shaped to receive the drive shaft (not shown) that provides the rotational power to the drive sprocket 10.

A plurality of rods 18 are positioned about the radial periphery of the spaced-apart inner rings 12, as shown in FIGS. 1A-C. The rods 18 are connected to the inner rings 12 such that a portion of each rod 18 extends laterally away from each of the inner rings 12 in a substantially parallel manner relative to the rotational axis of the drive sprocket 10. Accordingly, the plurality of rods 18 are attached to the inner rings 12 adjacent to the peripheral edge 12b. In an embodiment, a pair of rods 18 are positioned immediately adjacent to each other to form a cluster 19, and each cluster 19 is spaced apart about the periphery of the inner rings 12. In another embodiment, each rod 18 is spaced apart from each adjacent rod about the periphery of the inner rings 12. In an embodiment, the rods 18 are cylindrical, having a circular cross-sectional shape. It should be understood by one of ordinary skill in the art that the cross-sectional shape of the rods 18 can be any shape such as circular, square, triangular, or the like. The rods 18 are configured to engage the guide lugs positioned on the inner surface of a track. In an embodiment, as is shown in FIG. 1A, a portion of the circumferential surface of the rods 18 extend radially outward away from the outer peripheral surface 12a of the inner rings 12 relative to the rotational axis of the drive sprocket 10. As such, the rods 18 extend beyond the inner rings 12 to ensure engagement with the base of each guide lug of the track. Accordingly, a portion of the surface 18a of the rods 18 extends radially outward away from the outer peripheral surface 12a of the inner rings 12 relative to a rotational axis of the drive sprocket 10, and/or a portion of the surface 18a of the rods 18 extends radially outward away from the outer peripheral surface 20a of the guide rings 20 relative to a rotational axis of the drive sprocket 10. The rods 18 are oriented substantially perpendicular to the flat inner rings 12 to which they are attached.

A pair of guide rings 20 are attached to the rods 18, wherein each guide ring 20 is attached to adjacent ends of the rods 18 in a spaced-apart manner, as shown in FIGS. 1A-C. The guide rings 20 are single-piece annular members oriented in a substantially parallel manner on opposing sides of the spacer 14 and adapter 16. Accordingly, the guide rings 20 are fixedly attached to 18 rods, wherein each of the guide rings 20 is attached adjacent to an opposing end of the rods 18, such that the guide rings 20 are oriented substantially parallel to each other and said inner rings 12. The outwardly-directed surface 20c of the guide rings 20 are positioned outwardly from the rods 18. Similar to the inner rings 12, the rods 18 extend radially outward relative to the outer peripheral surface 20a of the guide rings 20. Accordingly, a portion of the surface 18a of said rods 18 extend radially outward away from the outer peripheral surface 20a of the guide rings 20 relative to a rotational axis of said drive sprocket 10.

In an embodiment, the outwardly directed surfaces of the guide rings 20 are coated with a reduced-friction material such as Teflon®, silicon, or the like. The reduced-friction material can be a spray-on type, adhesive type, or other manner of coating the guide rings 20. The reduced-friction material prevents rubbing and wear against adjacent lugs on the track when operated during dry conditions. However, if the utility vehicle is being used in a wet environment or on grass which may act as a lubricant, the reduced-friction material is optional. In another embodiment, a slide ring 22 which has low friction, wherein the outer peripheral edge of the slide ring 22 is rounded to reduce the impact against the adjacent lugs of the track. The slide ring 22 is formed of nylon 6/6 or other reduced-friction material. The slide ring 22 is formed as a continuous, single-piece annular member having substantially the same size and shape as the guide ring 20 to which it is attached. The slide ring 22 is attached to the guide ring 20 by way of a plurality of screws, but any other fastening mechanism can be used to attach each slide ring 22 to an outwardly-directed surface of a corresponding guide ring 20.

The inner rings 12 and the guide rings 20 can be formed of aluminum, steel, or any other material sufficient to withstand the stresses experienced during driving a tracked vehicle, particularly the lateral stresses experienced during a turn.

Figure 2A:
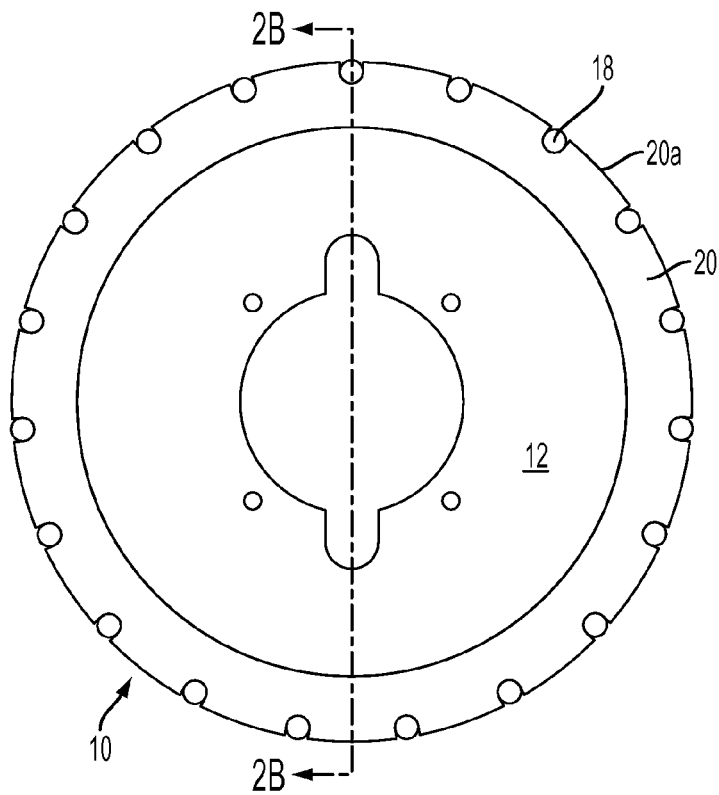
FIG. 2A is an end view of a second exemplary embodiment of a drive sprocket.
Figure 2B:
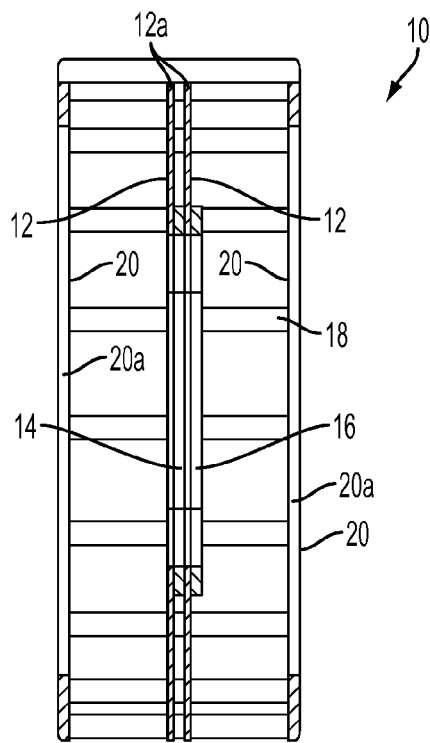
FIG. 2B is a view of a second exemplary embodiment of a drive sprocket taken along line 2B of FIG. 2A.
Figure 2C:
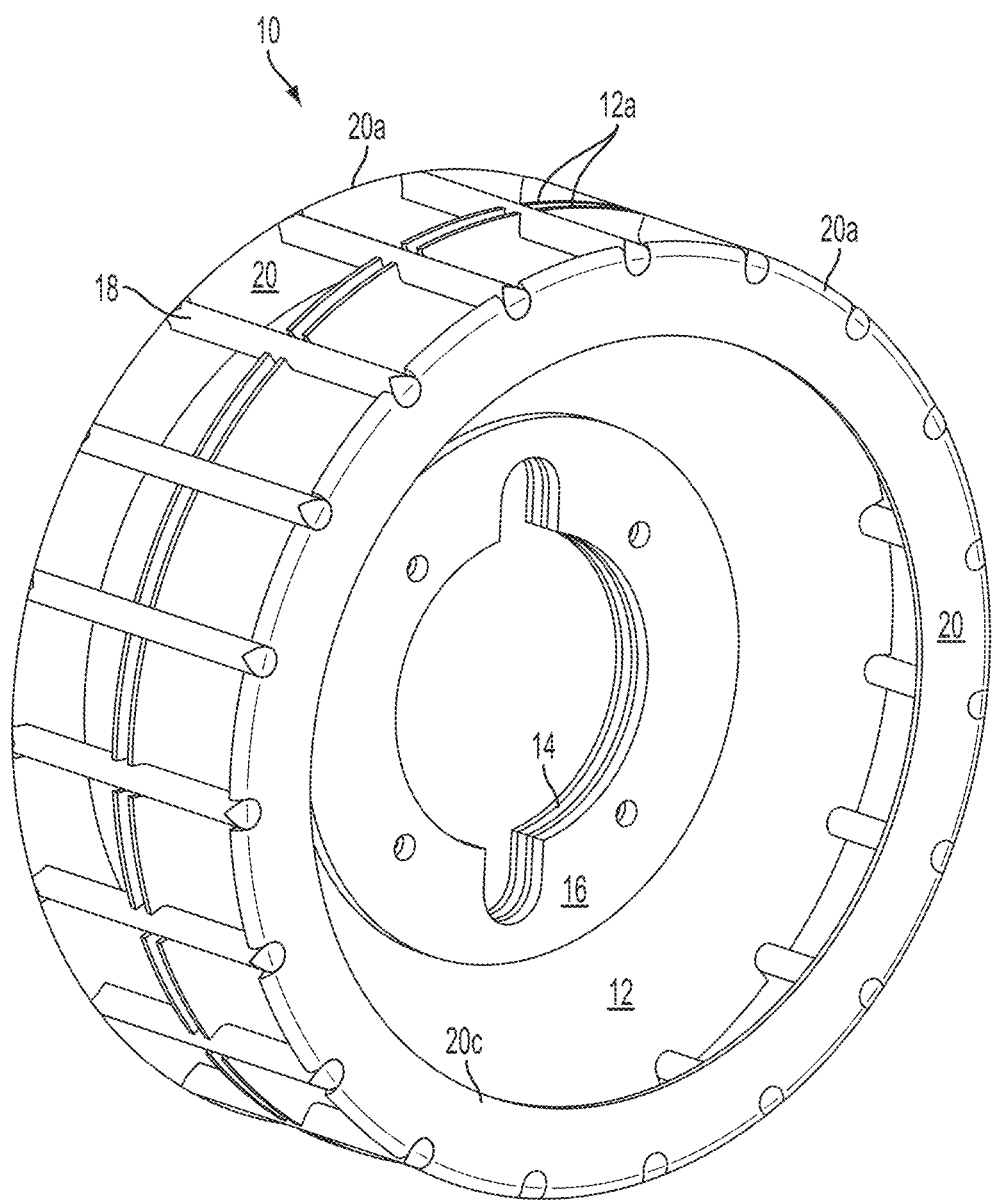
FIG. 2C is a perspective view of a second exemplary embodiment of a drive sprocket.

In the embodiment illustrated in FIGS. 2A-C, the drive sprocket 10 includes a pair of substantially circular inner rings 12. A spacer 14 is positioned between the pair of inner rings 12 to allow the inner rings 12 to be spaced apart. The thickness of the spacer 14 is between about 0.10 inches and about 3.0 inches. The spaced-apart inner rings 12 provide lateral stiffness to the drive sprocket 10, particularly with respect to the lateral forces experienced during a turn of the utility vehicle. The spacer 14 is sandwiched between the inner rings 12. An adapter 16 is positioned adjacent to the outwardmost inner ring 12 relative to the utility vehicle when the drive sprocket 10 is operatively connected to the utility vehicle. The adapter 16 is configured to engage a drive shaft or other rotatable shaft that operatively transfers rotation from the engine to the drive sprocket 10. When the drive sprocket 10 is installed onto the drive shaft, the adapter 16 is directed away from the utility vehicle.

In an embodiment, the inner rings 12 and the spacer 14 can be formed as a single member having an equivalent thickness. The spacer 14 allows the inner rings 12 to provide the structural integrity to the rods 18 while reducing the weight of the drive sprocket 10. In a similar manner, the adapter 16 can also be formed as having a diameter that is substantially the same as the inner rings 12. The spacer 14 and adapter 16 are attached to the inner rings 12 to allow the drive sprocket 10 to be attached to the drive shaft from an engine while transferring the rotational force to the inner rings 12. In another embodiment, the inner rings 12, spacer 14, and adapter 16 all include a common aperture shaped to receive the drive shaft (not shown) that provides the rotational power to the drive sprocket 10.

A plurality of rods 18 are positioned about the radial periphery of the spaced-apart inner rings 12, as shown in FIGS. 2A-C. The rods 18 are connected to the inner rings 12 such that a portion of each rod 18 extends laterally away from each of the inner rings 12 in a substantially parallel manner relative to the rotational axis of the drive sprocket 10. In an embodiment, each rod 18 is spaced apart from each adjacent rod about the periphery of the inner rings 12. In an embodiment, the rods 18 are cylindrical, having a circular cross-sectional shape. It should be understood by one of ordinary skill in the art that the cross-sectional shape of the rods 18 can be any shape such as circular, square, triangular, or the like. The rods 18 are configured to engage the guide lugs positioned on the inner surface of a track. In an embodiment, a portion of the circumferential surface of the rods 18 extend radially outward away from the outer peripheral surface 12a of the inner rings 12 relative to the rotational axis of the drive sprocket 10. As such, the rods 18 extend beyond the inner rings 12 to ensure engagement with the base of each guide lug of the track. The rods 18 are oriented substantially perpendicular to the flat inner rings 12 to which they are attached.

A pair of guide rings 20 are attached to the rods 18, wherein each guide ring 20 is attached to adjacent ends of the rods 18 in a spaced-apart manner, as shown in FIGS. 2A-C. The guide rings 20 are single-piece annular members oriented in a substantially parallel manner on opposing sides of the spacer 14 and adapter 16. The outwardly-directed surface of the guide rings 20 are positioned outwardly from the rods 18. Similar to the inner rings 12, the rods 18 extend radially outward relative to the outer peripheral surface 20a of the guide rings 20.

In some embodiments, the outwardly directed surfaces 20c of the guide rings 20 are not coated with a reduced-friction material, nor are guide rings 20 equipped with slide ring 22. Therefore, the reduced friction material and slide ring 22 are optional for guide rings 20.

The inner rings 12 and the guide rings 20 can be formed of aluminum, steel, or any other material sufficient to withstand the stresses experienced during driving a tracked vehicle, particularly the lateral stresses experienced during a turn.

Figure 3A:
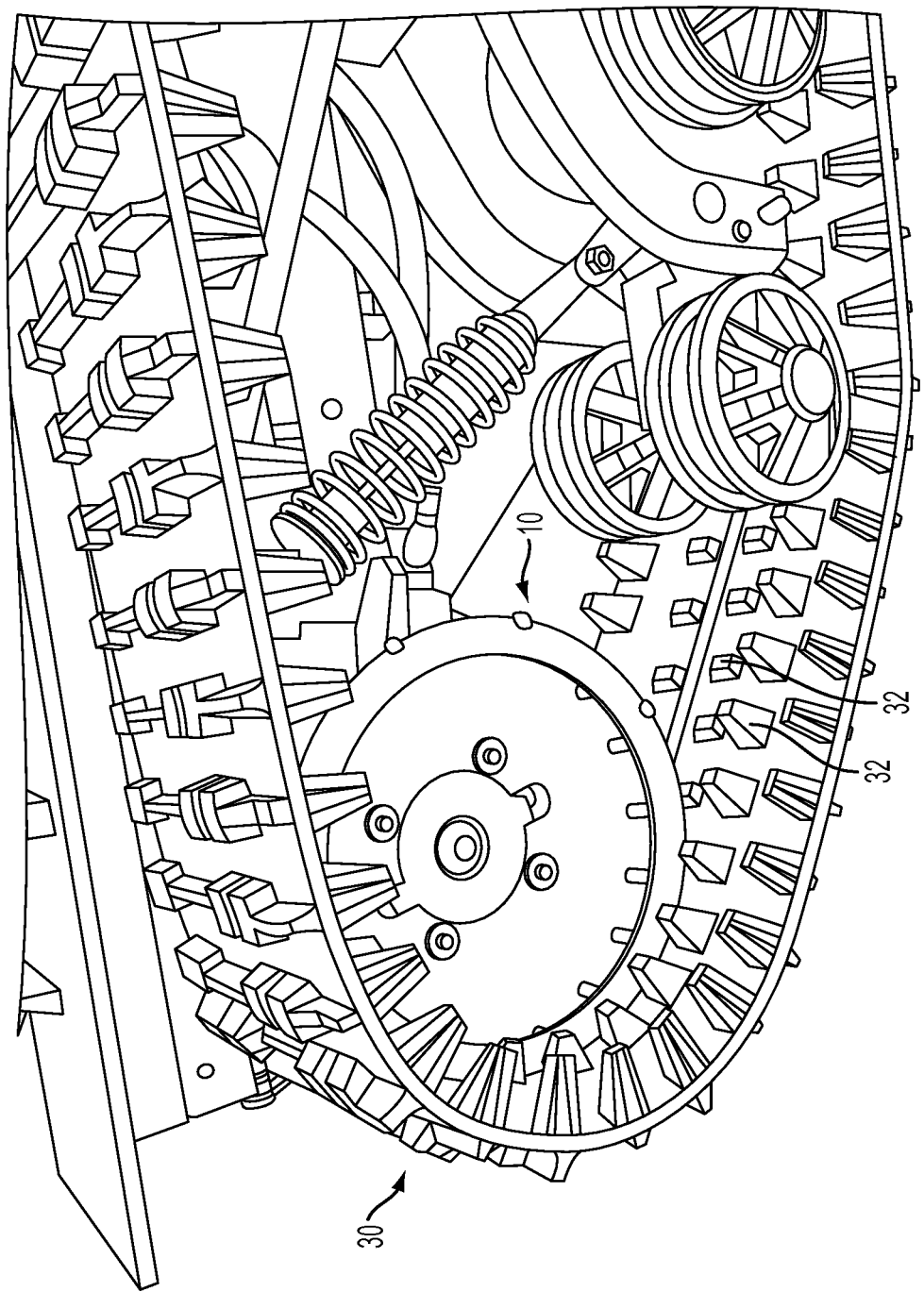
FIGS. 3A-B are perspective views of an embodiment of a drive sprocket on a tracked utility vehicle.
Figure 3B:
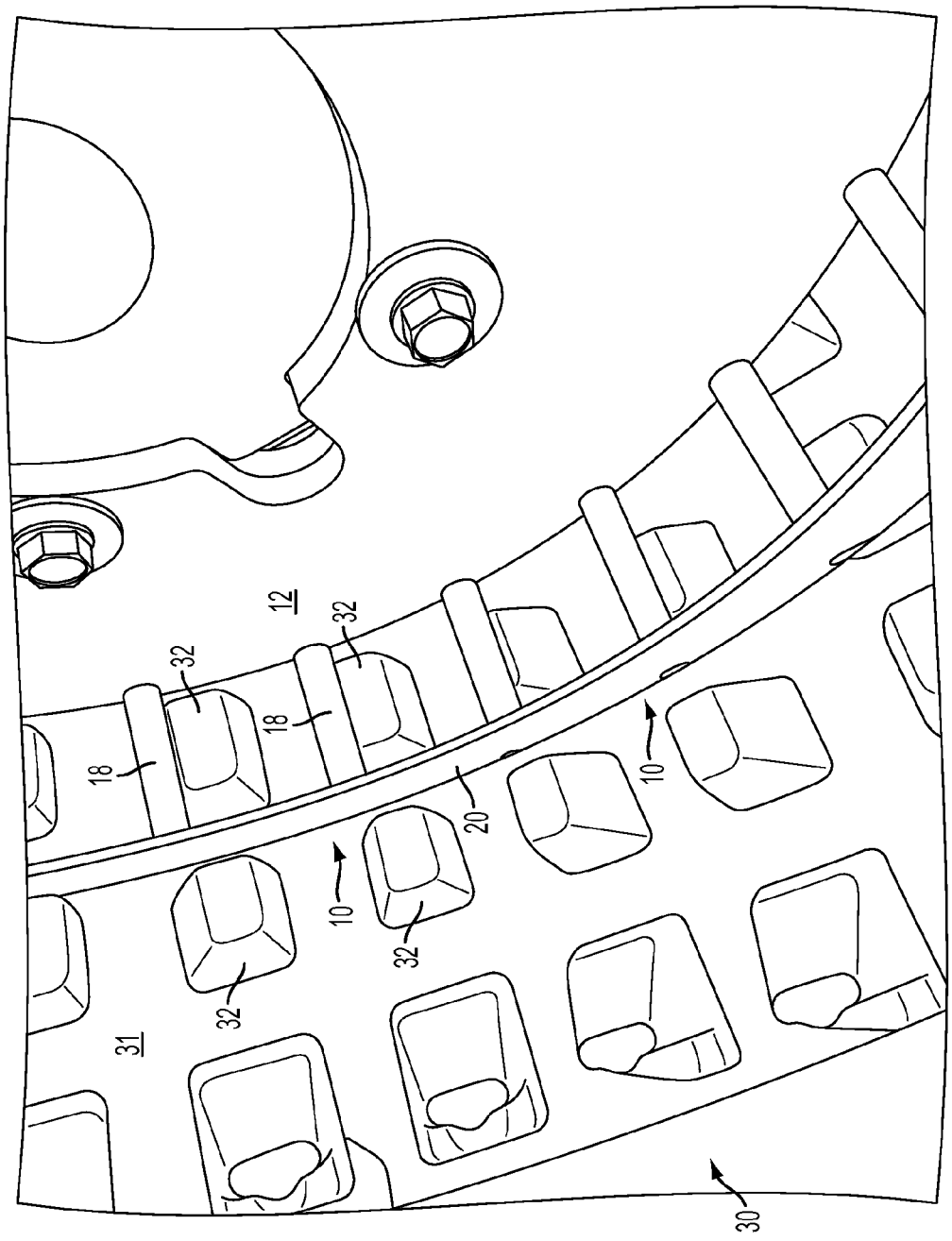

FIGS. 3A-B show an embodiment of drive sprocket 10 on a tracked utility vehicle. As was stated above, each track 30 of tracked utility vehicle has a plurality of drive lugs 32 arranged in an annular pattern on the inside surface 31 of track 30. Accordingly, in operation, rods 18 of drive sprocket 10 engage a drive lug 32 where drive lug 32 meets inside surface 31 of track 30, thereby rods 18 engage the traction drive lugs 32 of tracks 30 close to the traction drive lug pitch line, so as to reduce bending moments and stress on the drive lugs 32.

While this invention has been described in conjunction with the specific embodiments described above, it is evident that many alternatives, combinations, modifications and variations are apparent to those skilled in the art. Accordingly, the preferred embodiments of this invention, as set forth above are intended to be illustrative only, and not in a limiting sense. Various changes can be made without departing from the spirit and scope of this invention. Combinations of the above embodiments and other embodiments will be apparent to those of skill in the art upon studying the above description and are intended to be embraced therein. Therefore, the scope of the present invention is defined by the appended claims, and all devices, processes, and methods that come within the meaning of the claims, either literally or by equivalence, are intended to be embraced therein.

What is claimed is:

1. A drive sprocket for driving a track of a tracked utility vehicle, said drive sprocket comprising:
    a pair of spaced-apart inner rings, wherein said inner rings are oriented in a substantially spaced-apart manner, each of said inner rings having a peripheral edge;
    a plurality of rods attached to said inner rings adjacent to said peripheral edge thereof, said rods having a surface; and
    a pair of guide rings fixedly attached to said rods, wherein each of said guide rings is attached adjacent to an opposing end of said rods, said guide rings being oriented substantially parallel to each other and said inner rings;
    wherein a portion of said surface of said rods extend radially outward away from an outer peripheral surface of the inner rings relative to a rotational axis of said drive sprocket.

2. The drive sprocket of claim 1 further comprising a spacer positioned between said inner rings, said spacer being fixedly attached to said inner rings.

3. The drive sprocket of claim 1 further comprising an adapter attached to an outwardly-directed surface of one of said pair of inner rings.

4. The drive sprocket of claim 1 further comprising a slide ring attached to an outwardly-directed surface of each of said guide rings.

5. The drive sprocket of claim 1, wherein an outwardly-directed surface of each of said guide rings is coated with a friction-reducing material.

6. The drive sprocket of claim 1, wherein each of said plurality of rods is spaced-apart from adjacent rods.

7. The drive sprocket of claim 1, wherein said plurality of rods form a plurality of clusters, wherein each of said clusters is formed of a pair of said rods and each of said cluster is spaced-apart from adjacent clusters about said peripheral edge of said inner rings.

8. The drive sprocket of claim 1, wherein said rods are cylindrically shaped having a circumferential surface.

9. The drive sprocket of claim 8, a portion of said circumferential surface of said rods extend radially outward away from an outer peripheral surface of the guide rings relative to a rotational axis of said drive sprocket.

10. A drive sprocket for driving a track of a tracked utility vehicle, said drive sprocket comprising:
    a pair of spaced-apart inner rings, wherein said inner rings are oriented in a substantially spaced-apart manner, each of said inner rings having a peripheral edge;
    a plurality of rods attached to said inner rings adjacent to said peripheral edge thereof, said rods having a surface; and
    a pair of guide rings fixedly attached to said rods, wherein each of said guide rings is attached adjacent to an opposing end of said rods, said guide rings being oriented substantially parallel to each other and said inner rings;
    wherein a portion of said surface of said rods extend radially outward away from an outer peripheral surface of the guide rings relative to a rotational axis of said drive sprocket.

11. The drive sprocket of claim 10 further comprising a spacer positioned between said inner rings, said spacer being fixedly attached to said inner rings.

12. The drive sprocket of claim 10 further comprising an adapter attached to an outwardly-directed surface of one of said pair of inner rings.

13. The drive sprocket of claim 10 further comprising a slide ring attached to an outwardly-directed surface of each of said guide rings.

14. The drive sprocket of claim 10, wherein an outwardly-directed surface of each of said guide rings is coated with a friction-reducing material.

15. The drive sprocket of claim 10, wherein each of said plurality of rods is spaced-apart from adjacent rods.

16. The drive sprocket of claim 10, wherein said plurality of rods form a plurality of clusters, wherein each of said clusters is formed of a pair of said rods and each of said cluster is spaced-apart from adjacent clusters about said peripheral edge of said inner rings.

17. The drive sprocket of claim 10, wherein said rods are cylindrically shaped having a circumferential surface.

18. The drive sprocket of claim 17, a portion of said circumferential surface of said rods extend radially outward away from an outer peripheral surface of the inner rings relative to a rotational axis of said drive sprocket.

19. The drive sprocket of claim 10, wherein a portion of said surface of said rods extend radially outward away from an outer peripheral surface of the inner rings relative to a rotational axis of said drive sprocket.

20. A drive sprocket for driving a track of a tracked utility vehicle, said drive sprocket comprising:
    a pair of spaced-apart inner rings, wherein said inner rings are oriented in a substantially spaced-apart manner, each of said inner rings having a peripheral edge;
    a plurality of rods attached to said inner rings adjacent to said peripheral edge thereof, said rods having a surface; and
    a pair of guide rings fixedly attached to said rods, wherein each of said guide rings is attached adjacent to an opposing end of said rods, said guide rings being oriented substantially parallel to each other and said inner rings;
    wherein a portion of said circumferential surface of said rods extend radially outward away from an outer peripheral surface of the inner rings relative to a rotational axis of said drive sprocket, and/or a portion of said circumferential surface of said rods extend radially outward away from an outer peripheral surface of the guide rings relative to a rotational axis of said drive sprocket.

\* \* \* \* \*